United States Patent [19]

Kolbe et al.

[11] Patent Number: 4,515,648
[45] Date of Patent: May 7, 1985

[54] METHOD OF MAKING A GASTIGHT MULTIPLE-WALLED PLASTIC PANEL

[75] Inventors: Klaus Kolbe, Reinheim; Walter Hellmann; Otmar Krajec, both of Rossdorf; Hartmut Schikowsky, Darmstadt; Heinz Vetter, Rossdorf, all of Fed. Rep. of Germany

[73] Assignee: Röhm GmbH, Darmstadt, Fed. Rep. of Germany

[21] Appl. No.: 450,016

[22] Filed: Dec. 15, 1982

[30] Foreign Application Priority Data

Dec. 28, 1981 [DE] Fed. Rep. of Germany ... 8137938[U]

[51] Int. Cl.$^3$ .................. B29D 23/04; B32B 31/02
[52] U.S. Cl. ..................... 156/196; 156/198; 156/244.13; 156/244.24; 156/250; 156/251; 156/304.1
[58] Field of Search .............. 156/242, 245, 244.13, 156/244.24, 251, 304.1, 304.2, 292, 515, 196, 198, 250

[56] References Cited

U.S. PATENT DOCUMENTS 4,172,749 10/1979 Liggett ........................ 156/244.13
4,390,383 6/1983 Van Dongeren .............. 156/304.2

FOREIGN PATENT DOCUMENTS 7307322 6/1973 Fed. Rep. of Germany .
2730087 1/1979 Fed. Rep. of Germany .
2802179 7/1979 Fed. Rep. of Germany .
1531608 11/1978 United Kingdom .

*Primary Examiner*—Caleb Weston
*Attorney, Agent, or Firm*—Curtis, Morris & Safford

[57] ABSTRACT

What is disclosed is a method for making a gastight multiple-walled panel of extruded resin from an integrally extruded hollow panel comprising two parallel, plane outer walls having supporting partitions disposed between them and defining long hollow cells with open end faces, which method comprises heating the hollow panel at least in the area of the open end faces of said hollow cells until the resin is in the thermoplastic state, and then heat sealing the two outer walls in the thermoplastic area thereof in a gastight manner either to each other or to a tape of a further thermoplastic material covering the end faces, the seal so produced being held for at least 1 minute at a temperature ranging from 10° C. beneath the Vicat softening point to 20° C. above the Vicat softening point of the resin.

14 Claims, 8 Drawing Figures

METHOD OF MAKING A GASTIGHT MULTIPLE-WALLED PLASTIC PANEL

The present invention relates to a method of producing a multiple-walled panel, made of an extruded synthetic resin and sealed gastight, starting from an integrally extruded hollow panel comprising two substantially plane, parallel outer walls and supporting partitions disposed between and connecting said outer walls and extruded integrally therewith, said panel containing a plurality of hollow cells enclosed between said outer walls and said partitions. The outer walls and the partitions are extruded as one piece from a thermoplastic material which preferably is transparent, and more particularly is glass clear. The partitions may extend obliquely relative to the outer walls but are preferably disposed perpendicularly thereto. Moreover, the partitions in the interior of the multiple-walled panel may be interconnected by separate intermediate walls preferably disposed parallel to the outer walls.

Integrally extruded multiple-walled panels of this type are used on a large scale in place of glass paneling for greenhouses, indoor swimming pools, workshops, etc. The multiple-walled panels used in such paneling have open end faces, and the hollow cells therefore communicate with the atmosphere. As a rule, these panels are installed in such a way that the hollow cells are largely sealed against dust, dirt, water and insects; but even then, they are not sealed against the atmosphere. The end faces may be set into a frame section, for example, or closed with a U-section molding.

In using such multiple-walled panels, it was soon found that water of condensation which forms in the hollow cells poses a problem. If the water is unable to drain, it will accumulate in the course of time in such amounts that it will fill a considerable portion of the hollow cells. The formation of this water of condensation has been attributed to the fact that the resins, mainly polymethyl methacrylate (PMMA), used to produce the multiple-walled panels are able to absorb small amounts of water ranging from about 0.5 to 1% under average humidity conditions. Through diffusion, water vapor then also enters the interior of the hollow cells, which can lead to the formation of water of condensation, especially when one of the outer walls is at a lower temperature than the other.

The invention relates in particular to multiple-walled panels of the type mentioned which remain substantially free of accumulations of water of condensation.

In its introductory part, German design Pat. No. 73 07 322 reports earlier attempts at solving the problem of dirt in the hollow cells of panels of this kind. Thus, the open end faces of the hollow panels forming the gutter of a greenhouse, for example, were closed off by cementing plastic strips over them. Then, however, the mentioned problem of the accumulation of water of condensation arose. That problem was solved by milling notches into the end edges of the partitions to provide an open connection between the partitions and the atmosphere through which the water of condensation could drain. However, in every case plastic strips were cemented only over the lower gutter edges; the upper edges, covered by a coping section, were left exposed.

To keep out dust and dirt while allowing water of condensation to drain, German design Pat. No. 73 07 322 provides for a U-section bar to be placed on the end face of a multiple-walled panel, the inner basal surface of the U-section being contoured to permit the hollow cell to communicate with the atmosphere. The insertable closure strips for multiple-walled panels which may be used according to published German patent application DOS No. 27 30 087 likewise do not provide a gastight seal.

According to published German patent application DOS No. 25 36 462, a plastic hollow strand stretched by gas pressure is, after extrusion and stretching, severed periodically into individual multiple-walled panels by means of heated heat-sealing jaws. In the process, the end of the hollow strand is sealed airtight while the closure of the cut-off multiple-walled panel being withdrawn from the heat-sealing jaws bursts open to release the compressed gas enclosed in the hollow cells. Thus the multiple-walled panels have a gastight closure at one end face but are open to the atmosphere at the other end face.

In accordance with published German patent application DOS No. 28 02 179, a multiple-walled panel is closed practically airtight by being heated to molding temperature and then is molded in its edge portions using a suitable molding machine in such a way that the two plane outer walls are compressed to form a flange-like border. While this type of closure does prevent the free exchange of air between the hollow cells and the ambient atmosphere, it is not gastight in the sense that the passage of gases would be completely prevented if a difference in pressure existed between the hollow cells and the atmosphere. As the plane outer walls are being molded to form a flangelike border, the two walls are brought into intimate contact with each other, but they are not fused to each other. The line of contact is not completely gastight and, in the presence of the pressure differences which occasionally arise between the hollow cells and the atmosphere, will allow pressure equalization. The likelihood of gas penetration is increased when, as is usually the case, the molding of the wall edges gives rise to stress cracks after cooling. Gas can then also penetrate through these cracks.

The object of the present invention is to improve the protection of multiple-walled panels against the formation and accumulation of water of condensation and against the penetration of dust and dirt.

Accomplishing this object has been made possible only by new knowledge gained with respect to the formation of water of condensation. Recent research has shown that, contrary to the view held up to now, the water absorbency of plastics, and especially of PMMA, or the diffusion of water vapor is not the primary cause of formation of water of condensation. Under the usual conditions of use, the transport of water by diffusion through the plastic walls of the multiple-walled panel alone will not result in troublesome accumulations of water of condensation so long as no extreme conditions prevail. Generally, any water which may have seeped in will soon escape again.

Rather, it has been found that the primary cause for the formation and accumulation of water of condensation is an effect which may be called "breathing". When the hollow cells are open to the atmosphere, air will be drawn into or blown out of the cells with each pressure difference between the gas space of the hollow cells and the atmosphere, no matter how small the opening may be. The pressure difference may be due to the daily fluctuations in atmospheric air pressure or to variations in the temperature of the air in the hollow cells. Along with the air drawn in, an amount of water vapor corresponding to the prevailing humidity may be introduced into the hollow cells, where it can easily result in the formation of considerable water of condensation. With the air, ultrafine dust is drawn in, which likewise can precipitate on the resin walls along with the condensed water and with time will result in an objectionable buildup of dirt. This is why the problems caused by water of condensation cannot be solved by providing a water drain opening alone.

The new finding on which the invention is based is that a deleterious accumulation of water of condensation and the drawing in of fine dust will not occur if the "breathing" of the hollow cells is suppressed. In accordance with the invention, this is done by completely dispensing with the drain openings for water of condensation which up to now have been regarded as essential and by sealing the hollow cells to be gastight against the atmosphere. However, the hollow cells need not be sealed gastight relative to one another. Within the meaning of the invention, the hollow cells will be "gastight" if they are not open to the atmosphere. (Some degree of gas permeability allowing diffusion will be disregarded.) Of course, the hollow cells will then also be watertight and dusttight.

The multiple-walled panels in accordance with the present invention are suitable for all uses for which multiple-walled panels having open hollow cells, or hollow cells not sealed gastight, have been used until now. The exclusion of dust is of advantage even in indoor use or use in a completely dry environment. The minimized formation of water of condensation and the prevention of accumulations of dirty water of condensation are of advantage in all uses where a multiple-walled panel is used to separate rooms having different temperature and/or humidity levels.

These multiple-walled panels therefore are suited for use as roofing, as glazing and as wall paneling for greenhouses, indoor swimming pools, gymnasiums, workshops, concourses in railroad terminals, etc.

According to the method of the present invention, the starting material may be hollow panels having open end faces, which are then individually closed at both ends. The sealing of the hollow cells is preferably combined immediately after extrusion with the severing of the continuously extruded hollow strand into individual panels. The strand is slit and the two ends so created are sealed gastight in the same operation.

A better understanding of the present invention and of its many advantages will be had by referring to the accompanying drawings, wherein.

Figure 1:
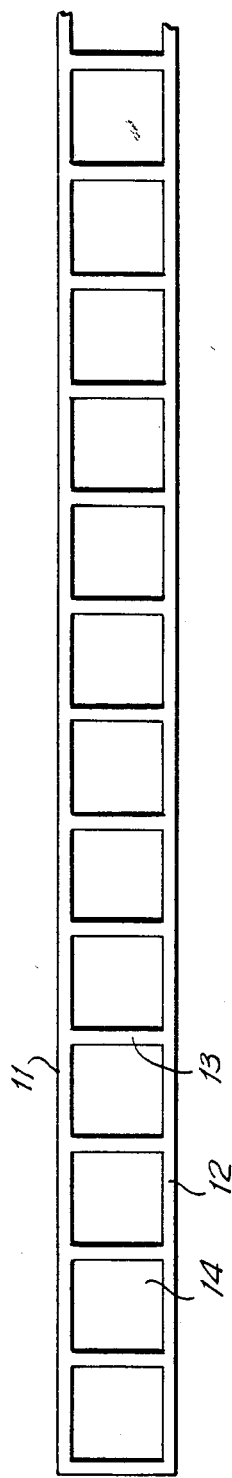
FIG. 1 is an end view of the unsealed end face of a typical multiple-walled panel which is to be sealed in accordance with the invention.

More in particular, panels of the type shown in FIG. 1 comprise outer walls 11 and 12 and supporting partitions 13, all of which define a plurality of longitudinal open cells 14.

The panels are typically from 3 to 60 mm, and preferably from 10 to 20 mm, thick and have outer walls 11, 12 and supports 13 of a thickness between 0.5 and 3 mm. Hollow cells 14 usually have a square cross section. With typical panel widths ranging from 1000 to 2000 mm, a multiple-walled panel will have from 20 to 100 hollow cells side by side.

Figure 2:
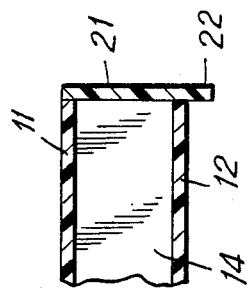

FIG. 2 shows an embodiment wherein a separately produced resin layer 21 is heat-sealed onto the open end faces of cells 14.

The bond may be produced by heating a resin tape 21, preferably made of the same resin as a panel, and an end face of a panel to the thermoplastic state and then joining them under pressure. A lateral overhang 22 may serve as a drip edge.

Figure 4:
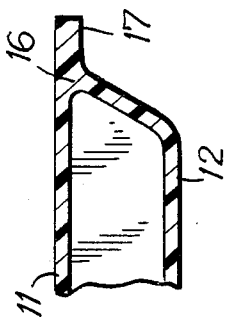
FIGS. 2-7 are partial side views, in section along lines 2-7 of FIG. 1, showing various embodiments of the sealed end faces of multiple-walled panels made gastight according to the present invention.
Figure 7:
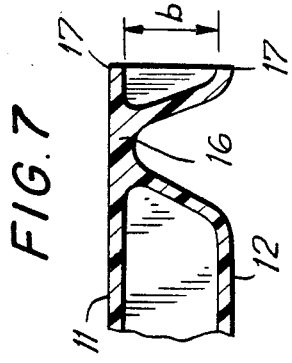

Still more simply and more practically, a zone along the end face of a width of about 10 to 20 mm can be heated to bring the resin of a panel to the thermoplastic state and then outer walls 11 and 12 can be pressed together by means of pinching jaws and fused together. The partitions 13 are thus buckled and fused to the material of the outer walls 11 and 12. In this way, various seal configurations as shown in FIGS. 3 to 7 can be obtained. Seal 16 may be disposed in the center plane of the panel, as FIG. 3, or to the side, for example, in the plane of the outer wall 11 as shown in FIG. 4. Installation will be facilitated if seal 16 produced by heat sealing comprises surface 17 which is substantially parallel to outer walls 11, 12. This can readily be produced by appropriately shaped heat-sealing jaws.

Figure 3:
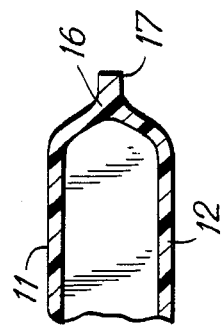
Figure 6:
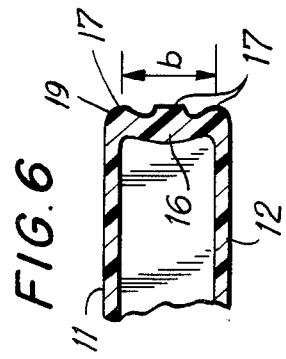

While weld, or seal 16 according to FIG. 3 is still thermoformable, it can be buckled with a hot die in the direction of the panel, as shown in FIG. 6, to provide enlarged bearing surface 19. An enlarged bearing surface or edge surface is of advantage when considerable forces, for example, the weight of a tall vertically disposed panel section, are acting upon it. Bearing surface 19, which extends perpendicularly to the surface of outer walls 11 and 12, advantageously has a width b of at least about one-half the thickness of the panel. According to FIG. 5, this is brought about through an appropriately shaped edge 18. That edge can be produced by thermoforming of the edge of the panel clenched between appropriately shaped dies. An edge so configured can further serve as a drip edge when the panel is used as a roofing material.

Figure 5:
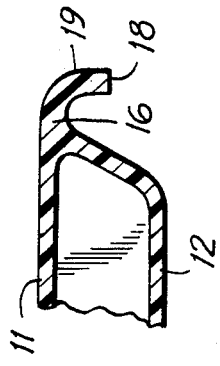

In place of a continuous bearing surface, as shown in FIGS. 2 and 5, a plurality of edges 17 disposed in a plane normal to the surface of the outer walls and spaced apart by a distance b of at least about one-half the thickness of the panel may be used to secure better distribution of stresses. This is achieved not only with the configuration shown in FIG. 6 but also with that of FIG. 7, where heat sealing occurs, not at the outermost edge of the panel but in the marginal zone, so that the original profile is still preserved at the outer edge.

When sealing is done by heat sealing, the hollow cells are closed at a time when the multiple-walled panel is thermoplastic at least over the area which enters into the formation of the seal and is deformed in the sealing operation. The two outer walls 11 and 12 are heat-sealed in a gastight manner either to each other or to a synthetic resin tape which covers the end faces and is likewise in the thermoplastic state. For the purposes of this operation, the synthetic resin can be regarded as being thermoplastic when the resin parts brought into contact with each other will fuse under pressure to form a continuous adhesive joint. This will generally be indicated by the fact that the reflection of light ceases at the interface.

Heat sealing by means of pressing jaws which press the outer walls together along with the interposed partitions or press a tape onto the end face may set up stresses in the synthetic resin material, especially in the case of relatively thin-walled parts made of resins having limited impact strength, such as PMMA. It has been found that such stresses may result in cracks which would destroy the gastight seal and give rise to the deleterious consequences of "breathing". In accordance with a preferred embodiment of the invention, these drawbacks are overcome by holding seal 16, produced in the thermoplastic state, and the area of the panel adjacent thereto, for at least about 1 minute, and preferably for from about 5 to about 15 minutes, at a temperature ranging from about 10° C. below the Vicat softening point to about 20° C. above the Vicat softening point of the synthetic resin material of the multiple-walled panel. The higher the temperature, the shorter the holding time. At the high end of the temperature range, from 1 to 2 minutes will suffice, while at the low end 15 minutes or more will be required. When heat distortion is to be expected, the Vicat softening point should not be exceeded by more than about 10° C. to 12° C. In the case of PMMA, the optimum post-heating temperature range is approximately 110° to 130° C., the heating time ranging from about 5 to about 15 minutes. At 120° C., a heating time of approximately 10 minutes will be satisfactory.

The sealing of hollow cells 14 can be combined with an extrusion operation for the continuous production of a hollow strand by severing pieces of the desired length from the latter and, in the same operation, sealing the end faces so created on both sides of the cut-off point. This is preferably done at a point in the extruder where the strand temperature has already dropped below the softening point. Since the continuously advancing strand is sealed at its leading end, the hollow cells must be filled during extrusion with air or another inert gas through lines passing through the extrusion die mandrels which form the hollow cells. This gas may be introduced at a pressure slightly above atmospheric in order to support the hollow strand in the plastic state. In this case, it is possible to operate without a vacuum in the forming channel. Since severing and sealing of the strand require some time while the strand continues to advance, the severing and sealing apparatus, which preferably operates fully automatically, is entrained on guide means alongside the strand at a speed corresponding to the extrusion speed. Upon completion of the operation, the apparatus is moved back to the next cut-off point on the strand.

The severing and sealing apparatus may be formed of a saw, heating means, and pressing means, for example. Through a cut made at right angles to the extruder, the saw severs a piece of the desired length from the hollow strand. The two cut surfaces as well as two synthetic resin tapes suited for the sealing of the end faces are heated by the heating means to the thermoplastic state, and one of these tapes is then heat-sealed to each end face by the pressing means.

Figure 8:
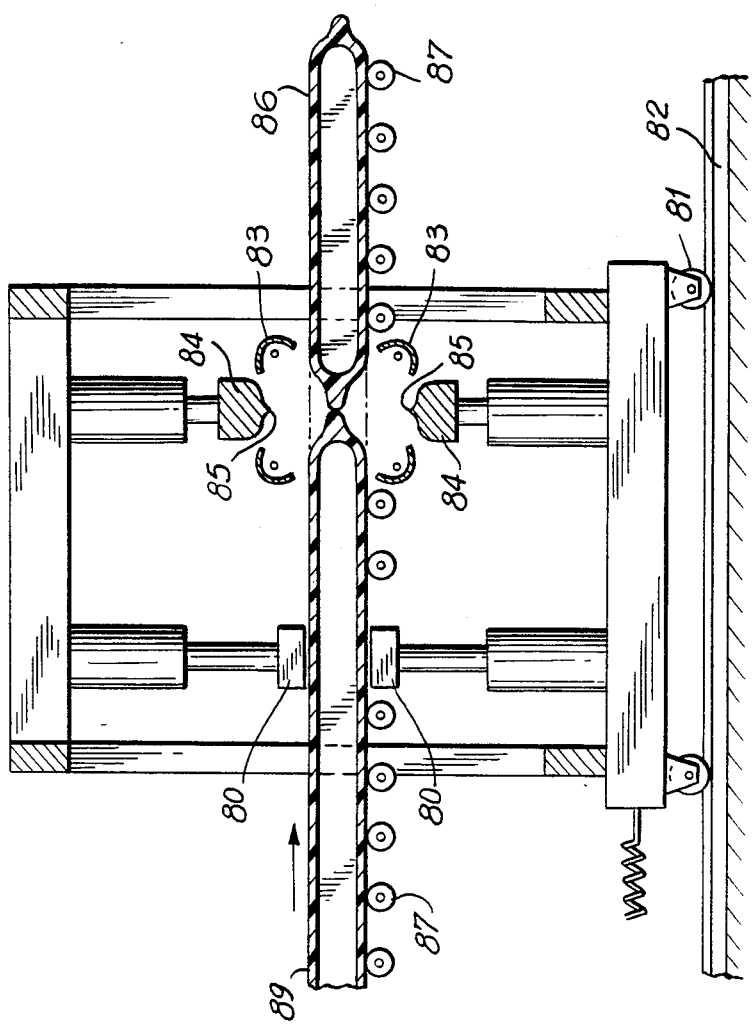
FIG. 8 is a side sectional view of an apparatus for performing the method of the invention.

Another sealing apparatus is shown in FIG. 8. It is clamped by means of hydraulically driven jaws 80 to hollow strand 89 which moves continuously on train of rollers 87 in the direction indicated by the arrow and is entrained by the strand to roll on rails 82 by means of rollers 81. The length of hollow strand to be deformed is heated by heat lamps 83 to the thermoplastic state. When the latter has been reached, heated cutting and heat-sealing jaws 84 are hydraulically extended until cutting edges 85 meet in the center of the strand. After jaws 84 have been retracted, heat lamps 83 may be allowed to continue to burn at reduced power in order to post-heat the seals to relieve internal stresses. Severed multiple-walled panel 86, now sealed gastight, is then taken off, clamping jaws 80 are released, and the sealing apparatus is moved back on the rails 82 to the next cut-off point.

When the post-heating time required for stress relief is longer than the cycle time during which the desired length of panel is extruded, post-heating will have to be carried out with a separate apparatus. A heated tunnel heater (not shown), for example, of adequate length in which the whole panel is post-heated, is suitable for this purpose. Individual heat lamps might also be carried along at sealing points 16 with the leading end of the strand and the severed panels, a plurality of heat lamps being movable on rails or suspended from chains along the extrusion path. The heat lamps may be interconnected at fixed intervals corresponding to the length of a panel and moved back by the length of a panel after one cycle time.

Other edge configurations in accordance with FIGS. 4 to 7 may be produced continuously with appropriately shaped heat-sealing and cutting jaws. All that is needed to produce an edge configuration corresponding to FIG. 4 is a heat-sealing jaw acting from one side upon a fixed and preferably heated support. An edge configuration corresponding to FIG. 7 can be produced with a fixture having two parallel heat-sealing jaws but no cutting edge 85. A bulge with short closed cells is produced between the two heat-sealing jaws. After post-heating and cooling, this bulge is cut with a saw. The edge configuration according to FIG. 5 can be produced from an edge according to FIG. 4 with a surface 17 of proper length by bending the surface 17 while still soft with an additional tool to form drip edge 18. Through buckling while soft, the edge configuration according to FIG. 6 can be produced from that of FIG. 3 by the use of an additional tool.

We claim:
1. A method of making a gastight multiple-walled panel, formed from a synthetic resin, which method comprises the steps of:
 (a) heating a portion of a multiple-walled panel formed from a synthetic resin, said panel having at least two substantially parallel outer walls and at least two partition walls disposed transversely thereto to form a hollow cell, at least to a temperature at which the resin in said heated panel portion is in a thermplastic state;
 (b) joining the outer walls of said heated panel portion to form a gastight seal;
 (c) maintaining said heated panel portion comprising said gastight seal at a temperature in the range from about 10° C. below to about 70° C. above the Vicat softening temperature of said resin, said panel being heated for a period of at least one minute at higher temperatures within this range to about 15 minutes or more at lower temperatures in this range until internal stresses in the region of said gastight seal are relieved; and then
 (d) cooling the heated panel portion and gastight seal therein to room temperature, whereby a panel free of cracks in the region of the gastight seal is obtained
2. A method of making a substantially gastight multiple-walled panel according to claim 2 wherein said outer walls of said panel are joined by a tape of synthetic resinous material.

3. A method of making a substantially gastight multiple-walled panel according to claim 1 wherein said outer walls of said panel are joined by deforming them by compression.

4. A method of making a substantially gastight multiple-walled panel according to claim 1 wherein the outer walls are joined to form a seal at a point on said panel spaced inwardly from the outermost edge.

5. A method of making a substantially gastight multiple-walled panel according to claim 1 which further comprises the step of forming a cut in a surface of the joined portion of said outer walls to facilitate the division of said the panel into panel sections.

6. A method of making a gastight multiple-walled panel according to claim 1 wherein the portion of said multiple-walled panel where the seal is formed is post-heated by passing it through a heat tunnel.

7. A method of making a gastight multiple-walled panel according to claim 1 wherein said multiple-walled panel is formed by an extrusion process and wherein the portion of said panel where the seal is formed is post-heated by passing it through a heat tunnel at a rate which is substantially equal to the rate at which said panel is extruded.

8. A method of making a gastight multiple-walled panel according to claim 1 wherein said multiple-walled panel is formed by an extrusion process and wherein the portion of said panel where the seal is formed is post-heated by passing it before movable heating means, said movable heating means moving synchronously with said extruded panel and being positioned in proximity to said sealed portion of said panel during the post-heating period.

9. A method of making a gastight multiple-walled panel according to claim 1 wherein the seal formed by joining the outer walls of said panel includes a surface which is disposed substantially parallel to said outer walls.

10. A method of making a gastight multiple-walled panel according to claim 2 wherein the seal formed by joining the outer walls of said panel by a synthetic resinous tape includes a lateral overhang which serves as a drip edge.

11. A method of making a gastight multiple-walled panel according to claim 1 wherein at least one partition is joined with said outer walls of said heated panel portion to form a substantially gastight seal.

12. A method of making a gastight multiple-walled panel according to claim 1 which further comprises the step of buckling the seal formed by joining the outer walls of said panel to provide an enlarged bearing surface.

13. A method of making a gastight multiple-walled panel according to claim 12 wherein said bearing surface has a width of at least about one-half the thickness of said panel.

14. A method of making a gastight multiple-walled panel according to claim 1 wherein said outer walls are joined to form a gastight seal at the outermost edge of said panel.

* * * * *